Nov. 19, 1963 A. C. JACOBAEUS ETAL 3,111,559

SWITCHING MEANS FOR TELEPHONE SYSTEMS

Filed March 6, 1959 3 Sheets-Sheet 1

INVENTORS
ANTON CHRISTIAN JACOBAEUS
KURT KATZEFF
CARL GUNNAR SVALA
BY Hane and Nydick
ATTORNEYS INVENTORS
ANTON CHRISTIAN JACOBAEUS
KURT KATZEFF
CARL GUNNAR SVALA
BY Hane and Nydick
ATTORNEYS INVENTORS
ANTON CHRISTIAN JACOBAEUS
KURT KATZEFF
CARL GUNNAR SVALA
BY Hane and Nydick
ATTORNEYS United States Patent Office 3,111,559

Patented Nov. 19, 1963

3,111,559

SWITCHING MEANS FOR TELEPHONE SYSTEMS

Anton Christian Jacobaeus, Stockholm, Kurt Katzeff, Bandhagen, and Carl Gunnar Svala, Alvsjo, Sweden, assignors to Telefonaktiebolaget L M Ericsson, Stockholm, Sweden, a corporation of Sweden Filed Mar. 6, 1959, Ser. No. 799,835
Claims priority, application Sweden Nov. 24, 1958
4 Claims. (Cl. 179—18)

Figure 1:
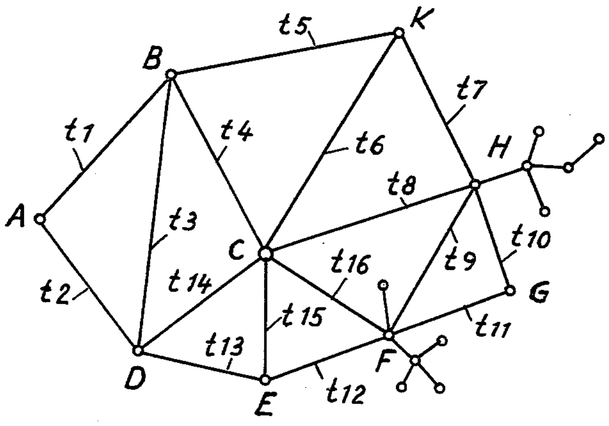

The present invention relates to automatic telephone systems with a number of exchanges in an arbitrarily shaped network. The telephone exchanges are interconnected by means of groups of lines or speaking-channels. Hereby a multiplicity of alternative connection paths are formed and the invention relates to a system for hunting a free path in the network with exploitation of all existing possibilities. Among the advantages of the invention there is provided increased availability through alternative routing, the registers of the exchanges are simplified because it is not necessary to know the appearance of the network, and traffic is regulated automatically upon faults or changes in the network.

The invention also has for an object to bring about a connection from a calling exchange to a called telephone station with a fixed telephone number but arbitrarily placed in the network or at least arbitrarily placed within a part of the network.

According to the invention the calling exchange comprises a sender which sends a calling signal, indicating at least part of the telephone number of the called station, and switching means connecting said sender with one idle outgoing channel in each traffic route extending from the exchange. Each exchange further comprises switching means for alternate routing, which identifies a calling incoming channel in one traffic route and connects the incoming channel with one idle outgoing channel in each from the exchange extending traffic route, excluding that of the calling channel, and registering means combined with means connecting the calling incoming channel to the registering means. Said calling signal sets the registering means and means associated therewith sends a revertive signal to the calling sender in response to the calling signal, if this signal corresponds to the telephone number of a station connected to the exchange. A marker sets the switching means for alternate routing if the calling signal does not correspond to a telephone number within the exchange; and consequently, the call is sent to more and more exchanges in the network until said revertive signal is received in the calling sender. The revertive signal marks the resulting communication in the line equipment of all lines, which pertain to said communication, and initiates with the aid of said line equipments the release of all channels which have been occupied by the call but which do not pertain to the resulting communication.

The calling signal in the above described switching means may be designed in different ways. If the calling signal indicates the number of only the called exchange, only one connection at a time can be connected to each exchange. This requires very rapid connections. By letting the calling signal indicate the number of the calling as well as the called exchange will be achieved that the limitation is restricted to the fact that only one connection at a time can be connected between two predetermined exchanges in the network. More unlimited possibilities of connecting are achieved by letting the calling signal indicate the number of the calling as well as the called exchange and besides the number of a switching instrument in the calling telephone exchange. This switching instrument may be a link in a circular, relatively short relay chain which is advanced one step at each call that goes out from the exchange. The number of the last connected link is allotted to the last emitted call. The switching instrument may also be that register in the calling exchange which directs the connecting, the number of the register being included in the calling signal.

The invention will be described more in detail with reference to the annexed drawings FIG. 1–FIG. 3.

In FIG. 1 is shown a number of telephone exchanges A–K combined by means of lines or speaking-channels *t1–t16* which form a checked, arbitrarily shaped network having a plurality of alternative connection paths between the exchanges. Each exchange A–K may be surrounded by subexchanges combined by means of junction lines which constitute a star-shaped local network as is shown for the exchanges F and H. The subexchanges are here regarded as parts of respective main exchange so that calls to and from them pass the main exchange. The internal traffic within a main exchange with pertaining subexchanges is lying outside the scope of this description.

A call from for example the exchange A to the exchange C can be connected through a plurality of different connection paths, for example *t1*+*t4*; *t2*+*t14*; *t1*+*t3*+*t14*; *t2*+*t3*+*t4*; *t1*+*t5*+*t6*; *t2*+*t13*+*t15*; and so on. The connecting process will be the following according to the invention: A line in each group of lines *t1* and *t2* is selected and a calling signal which indicates the exchange C is sent out on both lines. The calling signal is received in the exchanges B and D and a line in each of the groups of lines *t5*, *t4*, *t3* respectively *t3*, *t14*, *t13* is selected, after which the calling signal is sent through these lines. At the same time the calling signal is registered temporarily in a controlling means in each of the exchanges B and D. For each call that reaches an exchange, for example B, is controlled by reading of said controlling means that the call has not already been received in the exchange. When now a call comes in through a line in group *t3*, the call will be found already registered in the exchanges B and D for which reason the call is stopped. By a back signal the last occupied line can already now be released which however is not necessary at swift connecting processes. The call is forwarded to the exchange C through the groups of lines *t4* and *t14* and to the exchanges E and K through the groups of lines *t5* and *t13* if free lines exist in said groups. When free lines exist, the same call will arrive at the exchange C from two lines mainly simultaneously and are separated by common means, for example a marker which lets pass only one connection at a time. An answering device in the exchange C tests the calling signal for one call at a time and is affected when the signal indicates that the exchange C is the called exchange. In turn, the answering device sends an answering signal to that line, for example a line in group *t14*, through which the tested call arrives. This answering signal is received in the exchanges B and A in which those lines pertaining to the groups of lines *t5*, *t3* respectively *t2* which have been occupied by the call, are released while those lines pertaining to the groups of lines *t1* and *t4* through which the answering signal is received, are maintained and form a communication between the exchanges A and C. A release signal on the line included in the group *t2* releases all lines in the exchange D which are connected with this line.

If no free lines exist in the groups *t4* and *t14*, the call will be brought through the exchanges E and K to the exchanges C, H and F. If a free line exists in one of groups *t6* and *t15*, for example in *t6*, this line will be selected and the connection will be set up through the exchanges B and K.

The exchange C is a main exchange in the network shown in FIG. 1. Calls going out from the exchange C, for example to the exchange H, can possibly be connected through long roundabout routes, for example through the exchanges F, E, D, B and K. The probability that such a roundabout way will be used is however very small because the cross connections *t12*, *t13*, *t3*, *t5*, *t7* normally are calculated for great congestion values while the inner groups of lines *t8*, *t16*, *t15*, *t14*, *t4* and *t6* are calculated for small congestion values.

Figure 2:
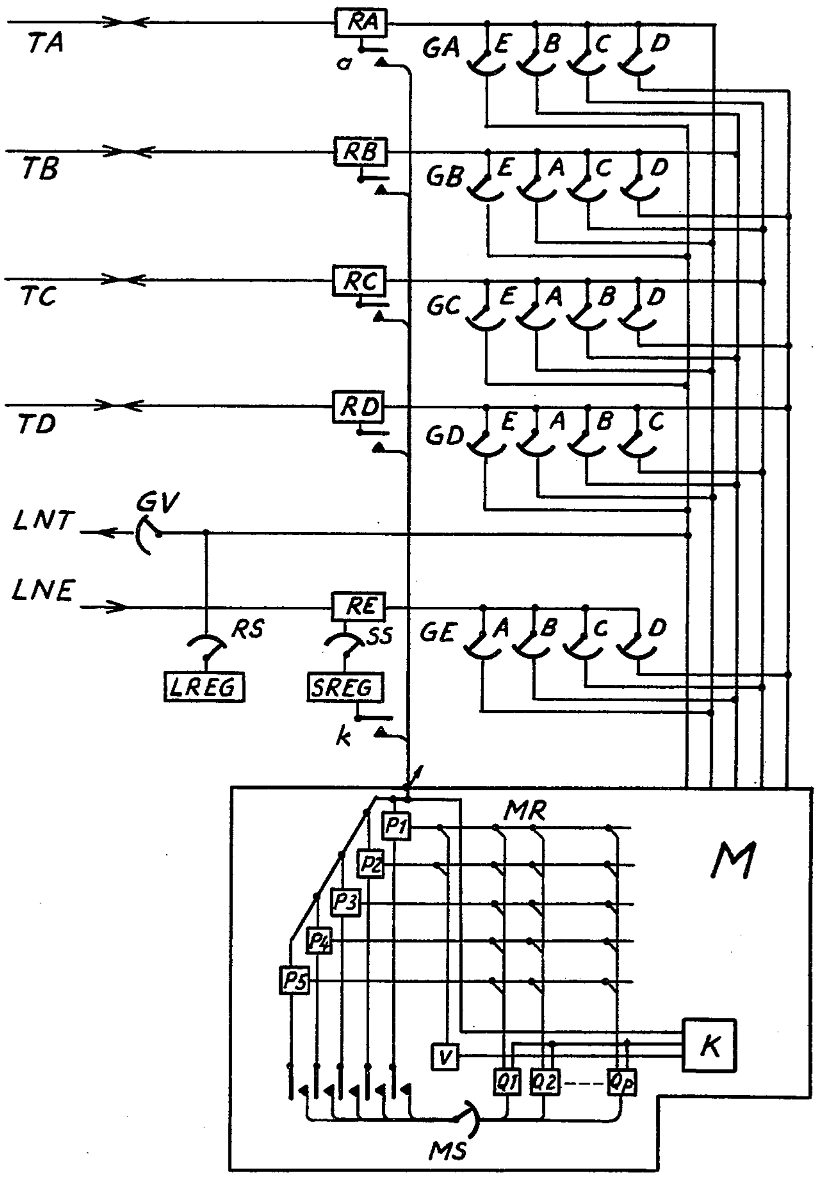

FIG. 2 shows a general view of the connection paths within a telephone exchange according to the invention. The groups of lines LNE and LNT constitute traffic channels from respectively to a local network. The groups of lines TA, TB, TC and TD represent four traffic routes with two-direction traffic to exchanges outside the local network. Each line in the groups TA–TD and LNE has a relay set RA–RE with signalling means and a group selecting means GA–GE. The relay sets RA–RE are arranged for signals in both directions. The relay set RE has connection to the register SREG for outgoing traffic through a register finder SS. The relay sets RA–RD and the registers SREG have connection to a common marker M through contact devices which in known manner are so designed that only one call at a time can be connected to the marker. Calls to the local network are connected through group selectors GV which have connection to local registers LREG through register finders RS. The relay sets RA–RD, the register SREG, the marker M are set forth in principle in the Lundkvist U.S. Patent No. 2,761,901. In FIG. 4 of the patent the sender and its selector SS are shown; and in FIG. 5 the marker M and line equipment RG1–RG4 are shown.

The group selecting means GA–GE for each incoming channel is built of partial selectors designated by A–E within each group selecting means. Each partial selector corresponds to one traffic route. Among the conditions for the group selecting means is that these means cannot connect in that traffic direction to which the channel itself belongs. This is arranged most simply by leaving out the partial selector corresponding to the channels, own traffic route. The division into partial selectors depends on another condition for the group selecting means, namely that it should be possible to connect calls simultaneously in all or at least several traffic directions and release them later on independently of each other, so that only one connection is left. At the setting up it is still not decided which partial selector is to be left. The group selector GA can connect to the local network through the partial selector E and to the traffic routes or the groups of lines TB–TD through the partial selectors B–D.

The marker M receives calling signals from the lines in the groups TA–TD and the registers SREG, after which the marker sets the group selectors GA–GE. In the expression "calling signal" is here included all signals required for indicating a call to a determined exchange. Suitably the calling signal consists of at least one voice frequency signal composed of several voice frequencies which voice frequency signal is connected to the output line of the connection from the register SREG which controls the setting up of the connection. The voice frequency combination indicates the number of at least the called exchange, is sent out on the speaking wires of the connection until a revertive answering signal is obtained and can serve as calling signal at the connection of new lines. Of course a particular calling impulse can precede said voice frequency signal, if necessary as regards the relay equipments of the lines, for example lines arranged for signals with direct current, 50-per alternating current or inductive impulses. At the present invention voice frequency signals however form the fundamentally essential calling signal which marks the channel busy and causes the line equipment to connect to the marker M. The signal is received in the marker M of the exchange, where it affects the registering means P1–P5. Of these registering means P1–P2 register a two-digit number which indicates the called exchange, and P3–P4 a two-digit number which indicates the calling exchange. The registering means P5 indicates one call out of a number of consecutive calls going out from the calling exchange. This number does not need to be large, for example 4. As, without practical difficulties, not more than 10 different signal voice frequencies can be held in the voice frequency band of a normal speaking-channel for telephony, suitably five higher and five lower voice frequencies will be selected and two digits are sent simultaneously, one by means of the higher and one by means of the lower frequencies. The value of each digit is indicated by a combination of 2 or 3 simultaneous frequencies. If the digits for the number of the called exchanges are indicated by means of combinations of two out of five voice frequencies and the digits for the number of the calling exchange by means of three out of five voice frequencies, these numbers may be sent alternatingly with an intermediate pause intended for revertive signals and a continuous signal is obtained which can be read with beginning after any pause. The voice frequency itself indicates the mutual sequence of two simultaneously transmitted digits and the number of voice frequencies in the combinations indicates a called respectively a calling exchange. A separation of simultaneous calls between two exchanges by means of registering of the sequence of the calls is required only at traffic between very large exchanges and may be done in several different ways, for example by means of switching between three types of voice frequency combinations, namely with each two, three or four voice frequencies in each signal. Generally the sequence of the calls may be indicated in connection with the number of the calling exchange, so that only one changeover between two types of voice frequency combinations is needed. The number of exchanges seldom exceeds 50 and the number of the calling exchange does not affect the settings of selectors but is taken along only in order to separate the calls and increase the trafficability. If voice frequency combinations are used having as well three as four voice frequencies for marking the origin of the calls, $15 \cdot 15 = 225$ combinations will be obtained and each exchange may be allotted for example 3 to 6 combinations in dependence on the size of the exchange which combinations are used in cyclical succession in order to separate the calls in the network. In the marker there are a multiple MR, an answering device V, a number of controlling means Q1–Q*p* and a selector MS for connection of these to the registering means P1–P5. Furthermore there is an operating relay set. The registering means P1–P5 correspond to relays MR4–MR7, and the answering device V, the operating relay set K correspond to relays MR1 and MR21–MR22, respectively, in FIG. 5 of the aforementioned patent; and contact *a* in FIG. 2 corresponds to discharge tube E1 in FIG. 4 of the patent.

Controlling means Q1–Q*p*, Q, and marking conductors MR are described in Nilsson et al. U.S. Patent No. 2,909,-607. The controlling means Q1–Q*p* and Q correspond to relay sets RO in the patent and marking conductors MR correspond to conductors U and T in FIG. 7 of the patent.

Figure 3:
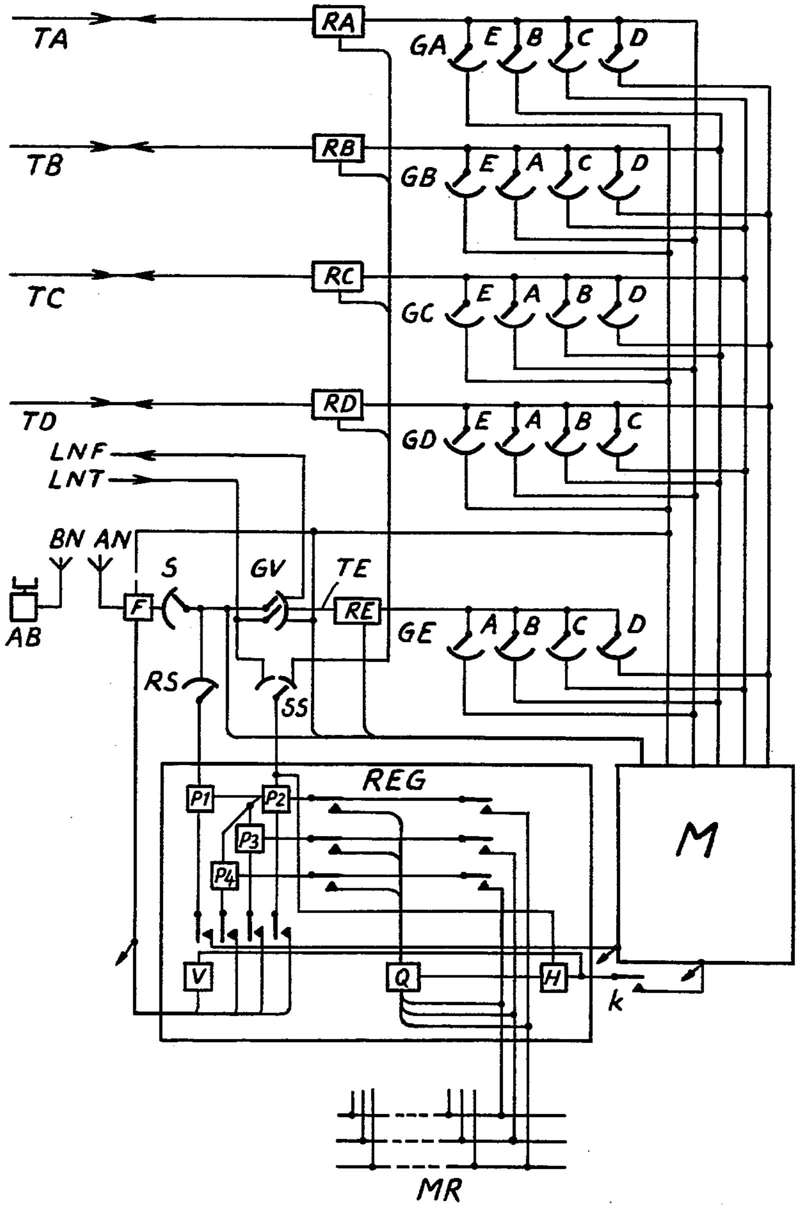

In FIG. 3 of the application, the calling signals are received in registers REG separated from the marker M. In this case, the registers REG correspond in principle to normal registers like those disclosed in FIG. 5 of the Nilsson et al. patent, which cooperate with relay sets RO in FIG. 7 together with marking conductors N. The relay set H in the register and the contact *k* in the application correspond to relays RR5–RR8 in the register REG and RO7–RO8 in the relay sets RO of the patent.

The switching means according to FIG. 2 works according to the following description. A call arriving for example through a line TA is connected through the contact *a* to the marker M. A voice frequency signal on the line sets in known manner the registering means P1–P5 which indicate the number of the called exchange and the origin of the call. The call is pointed out in a multiple MR containing five groups of wires, some of which are connected to a current source through registering means P1–P5. A number of controlling means Q1–Q*p* and an answering device V control the registering in the multiple MR. If the number registered on P1–P5 contains the number of the exchange to which the marker M belongs, the answering device V will be affected and an answering signal is sent to the calling line TA. The operating relay set K in the marker is operated and the marker connects the line TA through the partial selector GA–E to a local group selector GV. A local register LREG is connected through the register finder RS and the marker M is released. The further connecting process is entirely conventional.

If the number received in P1–P5 is found in one of the controlling means Q1–Q*p*, the operating relay set K will be operated so that the marker M is released without operating the group selector GA. The release of the marker is caused in a known manner by a release signal from the marker to the line equipment RA. Said signal actuates a blocking relay in equipment RA. The connection is stopped and RA waits for a release signal from the line TA.

If neither the answering device V nor any of the controlling means Q1–Q*p* is affected, the selector MS hunts for a free controlling means, for example Q2, and transmits the called number from P1–P5 to Q2. At the same time the marker M forwards the call. The calling line TA is marked by the contact *a* and the call is to be connected to one line in each outgoing route except that to which TA belongs. The marker, therefore, sets the partial selectors GA–B, GA–C and GA–D to each a free line TB, TC, respectively TD, so that the calling line TA is connected with these three lines simultaneously. If there is no free line, for example in the group TD, TA will be connected with the lines TB and TC while the partial selector GA–D like GA–E are unaffected. The marker M is then released but the controlling means Q2 remains set and marked busy for a short time, for example three seconds, in order to prevent the same call is connected twice, if it is transmitted through a line in one of the groups TB–TD. If then an answering signal arrives, for example through the line TB, this signal will be received in or transmitted from RB to the relay set RA, causing that the partial selectors RA–C and RA–D are restored while the connection between TA and TB through GA–B is held.

An outgoing call through a line LNE causes connection of a register SREG to the relay set RE by means of the register finder SS. After SREG has received the number of the called exchange, the marker M is connected through a contact device *k*. The marker connects the line LNE with a free line in each outgoing traffic direction by setting the partial selectors GE–A, GE–B, GE–C and GE–D to each a free line TA, TB, TC respectively TD. The marker is released and the register SREG connects a calling signal to all the selected outgoing lines via the relay set RE. This calling signal indicates the number of at least the called exchange as has been described above. When an answering signal is received in the relay set RE through for example the line TA, the connections through TB, TC and TD are released by restoring the partial selectors GE–B, GE–C and GE–D.

The invention is particularly suitable for car telephone systems and FIG. 3 shows how such a system may be designed. The system is thought to comprise a plurality of car telephone exchanges each equipped with a radio station and interconnected by means of groups of speaking-channels which form an arbitrarily shaped network. The car telephone subscribers should be able to get into communication with any other subscriber connected to the network directly or via the common telephone network, and it should be possible to call them without knowledge of the residence of the called car telephone subscriber within the network.

To this end there is a group selecting means in each car telephone exchange, by means of which a calling, incoming speaking-channel may be connected simultaneously with a speaking-channel in each other group of speaking-channels going out from the car telephone exchange, and finding means in each car telephone exchange which decide whether a call is directed to a subscriber who can be reached from the radio station of the telephone exchange, and, if so is the case, send out an answering signal to the calling speaking-channel, furthermore controlling means in each car telephone exchange which control that not the same call has already been received in the car telephone exchange, and signalling means for each incoming speaking-channel which receive said answering signal and on one hand forward the answering signal through the speaking-channel to the next preceding car telephone exchange, on the other hand cause release of all speaking-channels connected with the speaking-channel and going out from the exchange, except that speaking-channel through which the answering signal is received. The connecting process is characterized by the fact that connections are set up through all trafficable connection paths from a calling car telephone exchange to that car telephone exchange which can reach the called subscriber by a finiding process during which the last mentioned car telephone exchange is located by means of a calling signal which indicates the number of the called subscriber and which is spread successively to all car telephone exchanges in the network, after which a revertive signal from the called car telephone exchange indicates and selects the speaking-channels in the connection path through which communication is first obtained, and all speaking-channels not included in the connection path, which have been occupied during the finding process, are released.

Each radio exchange within the car telephone system has a station antenna and can reach those car telephone subscribers who are found within the range of the antenna. The ranges of the antennas are supposed not to overlap each other. Each car telephone subscriber has a radio antenna BN and a car telephone equipment. Each exchange antenna AN sends out continuously a number of carrier currents which each corresponds to a speaking-channel. Free speaking-channels are marked from the exchange by a continuous voice frequency modulated in the carrier current. A car telephone equipment which is connected and, sets itself automatically on a free speaking-channel and is ready to receive calling signals from the exchange. Each calling signal indicates the subscriber's number for a called car telephone subscriber is sent through all existing channels, and is received and controlled in all car telephone equipments. As known from car telephone systems, each car telephone has a call marking circuit closed only by receiving a call signal which corresponds to the telephone number of the car. The car telephone which is called recognizes the calling signal and marks the speaking-channel to which it is connected by means of an answering signal.

In FIG. 3 AB is a car telephone equipment with an antenna BN. Each car telephone exchange has radio equipment with an exchange antenna AN. The car telephone exchange comprises moreover selectors S and group selectors GV and a marker M and a number of registers REG having each two register finders RS and SS. Common to the registers REG there is a multiple MR within this case three groups of wires intended to mark each a digit in the number of a called car telephone subscriber. The car telephone system is here supposed to be intended for maximally 1000 cars and the numbers of the car telephone subscribers contain each three digits. Groups of junction lines or speaking-channels TA–TD connect the car telephone exchange with other car telephone exchanges and special incoming respectively outgoing lines LNT and LNF intermediate traffic to and from the common telephone network. Calls going out from the car telephone exchange to other car telephone exchanges pass the group selector GV and special trunk lines TE. All lines TA–TE have each a relay set RA–RE and each a group selecting means GA–GE built of partial selectors A–E. In the register REG there are four digit memories P1, P2, P3, P4, an answering device V, a controlling means Q and a relay equipment H. The register connects itself to the marker M through a contact device *k* which is so designed that only one register at a time can be connected to the marker.

Upon calls from a car telephone subscriber AB a signal is sent by means of a particular voice frequency through a speaking-channel, for which the car telephone equipment of the subscriber is set. The signal is received in the radio equipment F and the call is connected through the finder S and the register finder RS to the register REG. The subscriber hears a dialling tone and sends voice frequency impulses for setting of the register in known manner. First the digit memory P1 is set with voice frequency impulses which indicate if the call is directed to a car telephone subscriber or to a subscriber in the common network. In the last mentioned case the register connects itself immediately to the marker M through the contact *k*. The group selector GV is set to a free line LNF and the register and the marker are released. If the call is directed to a car telephone subscriber the register awaits those signals which indicate the number of the called car telephone subscriber and which are registered in the digit memories P2–P4. Then the register connects itself on one hand to the radio equipment F, on the other hand to the marker M. Under control of the register in P2–P4 the radio equipment F sends out calls on all free speaking-channels from the antenna AN. If the called subscriber is within the range of AN, an answering signal will be obtained on one of the speaking-channels of the radio equipment. The signal is transmitted from the radio equipment F to the answering means V in the register. The marker M is affected and is caused to set the group selector GV on that speaking-channel in the equipment F, on which the answering signal has been received. Then the register REG and the marker M are released.

If the called car telephone subscriber is not within the range of the antenna AN, the answering means V will not be affected and the marker sets the group selector GV to a trunk line TE and connects this through the partial selectors GE–A, GE–B, GE–C respectively GE–D to a line in each of the groups of lines TA, TB, TC respectively TD going out from the car telephone exchange. The marker is released and the register REG connects a voice frequency signal which in dependence on the memories P2–P3 sends out a calling signal on the lines TA–TD, which calling signal indicates the number of the called car telephone subscriber. When answer is received, for example through the line TA and the called subscriber has been found, the relay set RE will be operated and the not required connections through TB, TC respectively TD are released by restoring the partial selectors GE–B, GE–C and GE–D. The register REG is released. The partial selector GE–A is retained.

Calls from the common network arrive through the lines LNT and are connected to the register REG through the register finder SS. The direction digit that indicates that the call is directed to a car telephone subscriber is in this case already registered in an exchange belonging to the common network. The register REG thus receives the number of only the car telephone subscriber, which number is registered in the memory P2–P4. The connecting process becomes for the rest the same as for calls from a car telephone subscriber AB.

A call reaching a car telephone exchange, for example through a line TA, affects the relay set RA of the line so that the line is connected to a register REG through its register finder SS. The calling signal indicates the number of the called subscriber and is registered in the digit memories P2–P4. The register connects itself on one hand to the radio equipment F, on the other hand to the marker M by means of the contact device *k*. The calling signal is forwarded from the antenna AN and if answer is received the answering device V will be affected. The answering signal is repeated to the line TA and the marker is caused to connect the line TA through the partial selector GA–E to that speaking-channel in the radio equipment F over which answer has been obtained. If answering signal is not obtained the controlling means Q and the multiple MR which is common to all registers REG will control that no calls to the same car telephone subscriber are already existing in the exchange. If so is the case the register REG will be released and the station equipment F and the calling line TA are blocked while waiting for a release signal.

If there is no call to the called subscriber earlier registered in another register REG and if no answer is received within a certain time from the radio equipment F, the marker M will connect the calling line TA through the partial selectors GA–B, GA–C, GA–D with a line TB, a line TC and a line TD, after which the calling signal is forwarded through these lines to all adjacent car telephone exchanges for a continued searching for the called subscriber. The marker M and the radio equipment F are released but the register REG is retained until an answering signal that indicates that the telephone subscriber has been found, or a release signal reaches the relay set RA.

The calling signal through the lines TA, TB, TC and TD will in this case indicate a 3-digit subscriber's number. In another case 4-digit car telephone subscribers' numbers may be required. The calling signal must in spite of this be a short signal which swiftly can be transmitted between the telephone exchanges. Suitably a voice frequency signal composed of several frequencies is used. The number of voice frequencies must however be held down from as well practical as economical reasons. For car telephones the call is sufficiently specified by the number of the called car telephone subscriber, because never more than one connection at a time can be set up to each subscriber. In order to decrease the number of required frequencies at the voice frequency signalling, combinations comprising alternatingly 2 and 3 out of 6 voice frequencies are proposed. If two frequencies out of six are selected, 15 combinations will be obtained and if three frequencies out of six frequencies are selected, 20 combinations will be obtained. By means of two voice frequency signal impulses in each calling signal 300 numbers will be obtained. By means of three voice frequency signal impulses 1500 numbers will be achieved if the first impulse comprises 15 combinations with two frequencies in each, the second 10 combinations out of those 20 which may be obtained with three frequencies and the third those remaining 10 which may be obtained with three frequencies. By means of four voice frequency signal impulses in each calling signal 5000 numbers will be obtained, if the first impulse uses one of five determined combinations with two voice frequencies, the second one of the remaining 10 combinations with two frequencies, the third one of 10 determined combinations with three frequencies and the fourth one of the remaining 10 combinations with ten frequencies.

In this case is presupposed that maximally 1000 subscribers' numbers are required. By means of five voice frequencies and three voice frequency signal impulses per calling signal 1000 numbers will be obtained with only two frequencies in each impulse. In order not to be obliged to receive these in a determined order that must be marked by a particular pre-signal, for example a voice frequency impulse with a sixth frequency, voice frequency signals which appear simultaneously must indicate the mutual position of the digits in the subscribers' number. Two additional frequencies at the least are required for this, and thus seven voice frequencies are required. This signal system gives however simpler sending and receiving devices than the signal systems with six frequencies.

By means of five frequencies and three, respectively four voice frequency signal impulses in each answering signal 500 respectively 2500 numbers will be obtained and the first voice frequency impulse uses only one of the five frequencies, the second a combination of two frequencies, the third a combination of three frequencies and the fourth which increases the number capacity from 500 to 2500 numbers uses one of those five possible combinations which are obtained by means of four different, simultaneously appearing frequencies.

We claim:

1. In an automatic communication system, a plurality of exchanges, groups of channels joining said exchanges and forming an arbitrarily shaped network with traffic routes extending in various directions from each exchange, said plurality of exchanges including a calling exchange, a called station having a directory number, sending means in said calling exchange for sending a calling signal indicating at least part of the directory number of the called station, first switching means for connecting said sending means substantially simultaneously with one idle channel in each traffic route extending from the said calling exchange, second switching means for alternate routing in each exchange identifying a calling channel in one traffic route ad placing said calling channel in communication with one idle channel in each traffic route extending from the exchange, excluding that of the calling channel, registering means in each exchange, means in each exchange responsive to an incoming call over a channel for connecting said channel to said registering means, receipt of said calling signal over said calling channel setting said registering means, means associated with said registering means for sending a revertive signal to said sending means in response to receipt of a calling signal corresponding to said part of the directory number of a station connected to the exchange, and means for setting said second switching means for alternate routing when the calling signal does not correspond to a directory number within the exchange, the call sent out by the said sending means being distributed to more and more exchanges in the network until said revertive signal is received in said calling exchange and all passed intermediate exchanges, the revertive signal marking the first resulting connection and initiating the release of all channels which have been occupied by the call and which do not pertain to said resulting connection.

2. An automatic communication system according to claim 1 and further comprising controlling means in each exchange associated with said registering means and arranged to register the calling signal of each call incoming to the exchange through said channels for a moment sufficient for setting a connection through said exchange, and marking means common to said controlling means and all said registering means in the exchange for the actuation of said controlling means, in response to more than one call at a time in the exchange using the same calling signal, to stop all said calls but one.

3. In an automatic communication system, a plurality of exchanges, groups of channels joining said exchanges and forming an arbitrarily shaped network with traffic routes extending in different directions from each exchange, stations mobile among exchanges throughout said network and each having a directory number, communication means joining each exchange with all mobile stations which at the moment can be reached from the respective exchange, said plurality of exchanges including a calling exchange, a called mobile station having a directory number, sending means in said calling exchange for sending a calling signal indicating at least part of the directory number of the called mobile station, first switching means for connecting the sending means substantially simultaneously with one idle channel in each traffic route extending from the calling exchange, second switching means for alternate routing in each exchange identifying a calling channel in one traffic route and placing said calling channel in communication with one idle channel in each traffic route extending from the exchange, excluding that of the calling channel, registering means in each exchange, means in each exchange responsive to an incoming call over a channel for connecting said calling channel to said registering means, receipt of said calling signal over said calling channel setting said registering means, means associated with said registering means for sending a revertive signal to said sending means in response to receipt of a calling signal corresponding to at least said part of the directory number of a mobile station reached from the exchange, and means for setting said second switching means for alternate routing if the station is not reached from the exchange, the call sent out by said sending means being distributed to more and more exchanges in the network until said revertive signal is received in said calling exchange and all passed intermediate stations, the revertive signal marking the first resulting connection and initiating the release of all channels which have been occupied by the call and do not pertain to said connection.

4. An automatic communication system according to claim 3 and further comprising controlling means in each exchange associated with said registering means and arranged to register the calling signal of each call incoming to the exchange through said channels for a moment sufficient for setting a connection through said exchange, and marking means common to said controlling means and all said registering means in the exchange for actuation of said controlling means, in response to more than one call at a time in the exchange using the same calling signal, to stop all said calls but one.

References Cited in the file of this patent

UNITED STATES PATENTS

| | | |
|---|---|---|
| 2,750,448 | Mercer | June 12, 1956 |
| 2,761,901 | Lundkvist | Sept. 4, 1956 |
| 2,813,929 | Oberman | Nov. 19, 1957 |
| 2,945,211 | Gibson et al. | July 12, 1960 |
| 2,971,085 | Smith | Feb. 7, 1961 |